US010443619B2

United States Patent
Colson et al.

(10) Patent No.: US 10,443,619 B2
(45) Date of Patent: Oct. 15, 2019

(54) MOTOR HOUSING ASSEMBLY FOR A CABIN AIR COMPRESSOR

(71) Applicant: HAMILTON SUNDSTRAND CORPORATION, Windsor Locks, CT (US)

(72) Inventors: Darryl A. Colson, West Suffield, CT (US); Brent J. Merritt, Southwick, MA (US); Paul E. Hamel, Enfield, CT (US); David Anderson, Jr., Enfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 835 days.

(21) Appl. No.: 14/587,156

(22) Filed: Dec. 31, 2014

(65) Prior Publication Data

US 2016/0186777 A1   Jun. 30, 2016

(51) Int. Cl.
*F04D 29/58* (2006.01)
*F04D 25/06* (2006.01)
(Continued)

(52) U.S. Cl.
CPC ......... *F04D 29/5806* (2013.01); *F04D 25/06* (2013.01); *F04D 25/082* (2013.01);
(Continued)

(58) Field of Classification Search
CPC .... B23P 19/04; F04D 25/082; F04D 29/4226; F04D 29/5806; F04D 29/58; F04D 13/06;
(Continued)

(56) References Cited

U.S. PATENT DOCUMENTS

| 1,920,309 A | * | 8/1933 | Hoseason | ................. H02K 9/06 310/62 |
| 3,863,454 A | * | 2/1975 | Doerner | .................. F01D 25/18 60/669 |

(Continued)

OTHER PUBLICATIONS

CN Application No. 201511029305.6 First Office Action dated Sep. 28, 2018, 3 pages.

*Primary Examiner* — Kenneth J Hansen
*Assistant Examiner* — Chirag Jariwala
(74) *Attorney, Agent, or Firm* — Cantor Colburn LLP

(57) ABSTRACT

A motor housing assembly for a cabin air compressor assembly is provided that includes a central body portion, a first end portion, and a second end portion. The central body portion has an internal cavity configured to receive an electric motor. The first end portion includes a first and second motor cooling inlet duct. The second end portion includes a flange configured to couple with an outlet housing of the cabin air compressor assembly. A motor cooling duct centerline is defined between the first and second motor cooling inlet duct and is perpendicular to a central body portion centerline. A first distance is defined between an outer edge of the first and second motor cooling inlet duct. A second distance is defined between an outer face of the flange and an intersection of the centerlines. A ratio of the first distance to the second distance is between 1.29 and 1.3.

11 Claims, 5 Drawing Sheets

(51) Int. Cl.
  *F04D 25/08* (2006.01)
  *F04D 29/42* (2006.01)
  *B23P 19/04* (2006.01)

(52) U.S. Cl.
  CPC .......... *F04D 29/4226* (2013.01); *B23P 19/04* (2013.01); *H02K 2213/03* (2013.01)

(58) Field of Classification Search
  CPC ...... F04D 13/00; F04D 13/02; F04D 13/0653; F04D 25/00; F04D 25/02; F04D 25/06; F04D 25/08; F04D 29/002; F04D 29/40; F04D 29/403; F04D 29/42; F04D 29/4206; F04D 29/601; F04D 29/624; B64D 13/00; B64D 13/006; B64D 13/02; B64D 13/04; B64D 13/06; B64D 13/08; B64D 2013/0618; B64D 2013/0644; H02K 5/20; H02K 9/00; H02K 9/005; H02K 9/02–06; H02K 99/20; H02K 2209/00; H02K 2213/03
  USPC ........ 244/118.5; 62/401, 402; 417/321, 357, 417/366, 368, 410.1, 423.1, 423.7, 423.14
  See application file for complete search history.

(56) References Cited

U.S. PATENT DOCUMENTS

| | | | | |
|---|---|---|---|---|
| 3,911,694 A * | 10/1975 | Doerner | ................ | F01D 25/18 165/86 |
| 6,883,546 B1 * | 4/2005 | Kobylinski | ......... | F16L 55/1141 138/89 |
| 7,411,323 B2 * | 8/2008 | Pfannschmidt | .......... | H02K 1/20 310/58 |
| 7,462,018 B2 * | 12/2008 | Chou | ..................... | F04B 35/04 417/415 |
| 7,791,238 B2 * | 9/2010 | Pal | ........................ | F04D 25/082 310/156.12 |
| 8,543,365 B1 * | 9/2013 | Petro | ..................... | H02K 21/12 703/1 |
| 2004/0261428 A1 * | 12/2004 | Murry | ................... | B64D 13/06 62/86 |
| 2006/0073030 A1 * | 4/2006 | McAuliffe | ........... | F04D 25/082 417/366 |
| 2007/0018516 A1 | 1/2007 | Pal et al. | | |
| 2008/0309175 A1 * | 12/2008 | Telakowski | .............. | H02K 9/04 310/59 |
| 2012/0064814 A1 * | 3/2012 | Beers | .................... | F04D 25/082 454/71 |
| 2012/0242176 A1 * | 9/2012 | Pal | .......................... | H02K 1/20 310/43 |
| 2013/0084193 A1 * | 4/2013 | Beers | .................... | F04D 17/12 417/44.1 |
| 2013/0097996 A1 * | 4/2013 | Rosen | ................... | B64D 13/06 60/226.1 |
| 2013/0315712 A1 * | 11/2013 | Bogner | .................. | F01D 25/14 415/116 |
| 2014/0127050 A1 * | 5/2014 | Oda | ........................ | H02K 9/19 417/368 |
| 2014/0186161 A1 * | 7/2014 | Colson | ................. | F04D 17/122 415/170.1 |
| 2014/0199167 A1 * | 7/2014 | Beers | .................... | F04D 29/444 415/208.3 |
| 2015/0104301 A1 * | 4/2015 | Colson | ............. | H02K 15/0006 415/206 |
| 2015/0280513 A1 * | 10/2015 | Colson | .................... | H02K 5/20 310/58 |

* cited by examiner

MOTOR HOUSING ASSEMBLY FOR A CABIN AIR COMPRESSOR

BACKGROUND OF THE INVENTION

The subject matter disclosed herein relates generally to aircraft environmental control and, more particularly, to a motor housing assembly of a cabin air compressor motor for an aircraft environmental control system.

Environmental control systems (ECSs) are utilized on various types of aircraft for several purposes, such as in cooling systems for the aircraft. For example, components of an ECS may be utilized to remove heat from various aircraft lubrication and electrical systems and/or be used to condition aircraft cabin air. A cabin air conditioner includes one or more cabin air compressors (CACs) which compress air entering the system, from an outside source or a ram air system. The compressed air is delivered to an environmental control system to bring the compressed air to a desired temperature for delivery to the aircraft cabin. After passing through the cabin, the air is typically exhausted to the outside. CACs are typically driven by air-cooled electric motors. The electric motors include a motor stator and a motor rotor enclosed in a motor housing. Insufficient cooling flow through the motor housing can reduce the service life of motor components. Moisture in the air used to cool the motor may collect as condensation depending upon orientation of the CAC on the aircraft. Ingestion of a sufficiently large amount of condensation may adversely impact motor performance.

BRIEF DESCRIPTION OF THE INVENTION

According to one aspect of the invention, a motor housing assembly for a cabin air compressor assembly is provided. The motor housing assembly includes a central body portion, a first end portion, and a second end portion. The central body portion has an internal cavity that is configured to receive an electric motor. The first end portion includes a first and second motor cooling inlet duct. The second end portion includes a flange configured to couple with an outlet housing of the cabin air compressor assembly. A central body portion centerline is defined axially between the first end portion and the second end portion. A motor cooling duct centerline is defined between the first and second motor cooling inlet duct and perpendicular to the central body portion centerline. A first distance is defined between an outer edge of the first and second motor cooling inlet duct. A second distance is defined between an outer face of the flange and an intersection of the central body portion centerline with the motor cooling duct centerline. A ratio of the first distance to the second distance is between 1.29 and 1.3.

According to another aspect of the invention, a method of installing a motor housing assembly in a cabin air compressor assembly is provided. A flange of the motor housing assembly is aligned with an outlet housing of the cabin air compressor assembly such that a central body portion centerline of the motor housing assembly is axially aligned with an axis of rotation of the cabin air compressor assembly. A motor cooling duct centerline is defined between a first and second motor cooling inlet duct of the motor housing assembly and perpendicular to the central body portion centerline. A first distance is defined between an outer edge of the first and second motor cooling inlet duct. A second distance is defined between an outer face of the flange and an intersection of the central body portion centerline with the motor cooling duct centerline. A ratio of the first distance to the second distance is between 1.29 and 1.3. The flange is fastened to the outlet housing. An electric motor is inserted into an internal cavity of the motor housing assembly.

Other aspects, features, and techniques of the invention will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION OF THE INVENTION

Figure 1:
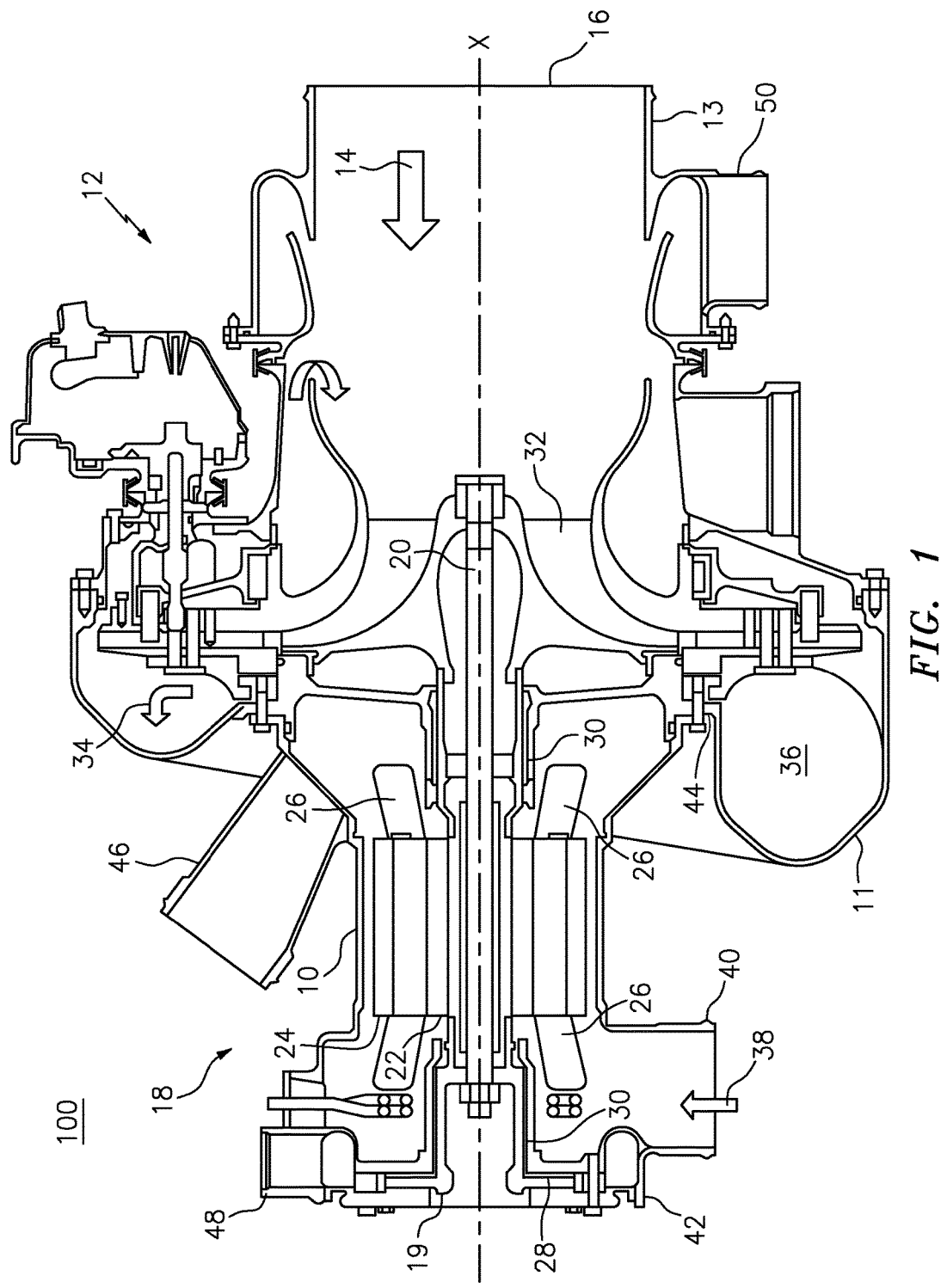
FIG. 1 is a partial cross-sectional view of a cabin air compressor assembly according to an embodiment of the invention.

Referring to the drawings, FIG. 1 is a cross-sectional view of a cabin air compressor (CAC) assembly 12 which may be used in an environmental control system 100 for an aircraft. The CAC assembly 12 compresses air flow 14 that is received at a compressor inlet 16. The CAC assembly 12 includes a motor housing assembly 10 coupled to an outlet housing 11 and an inlet housing 13. The motor housing assembly 10 is configured to receive a CAC motor 18 that is operably connected to a compressor rotor 32 of CAC assembly 12 via a tie rod 20 and thrust shaft 19. The thrust shaft 19 and tie rod 20 are both aligned along an axis of rotation X. The CAC motor 18 is an electric motor and includes a rotor 22 and a stator 24, which are both aligned along the axis of rotation X. The rotor 22 is operably coupled to tie rod 20, which extends longitudinally through rotor 22 for rotating of a compressor rotor 32. The stator 24 is generally disposed radially outboard of rotor 22 within motor housing assembly 10. Also, stator 24 includes a plurality of stator end windings 26 that generally extend axially from the ends of stator 24. In an embodiment, compressor rotor 32 is operably connected to tie rod 20 and is driven for rotation about the axis of rotation X by CAC motor 18. The driven compressor rotor 32 compresses the air flow 14 to provide a compressed air flow 34 at a compressor outlet 36. The CAC assembly 12 also includes one or more thrust bearings 28 and one or more journal bearings 30 to support rotation of rotor 22. To prevent overheating of the CAC motor 18, a motor cooling flow 38 is supplied via a motor cooling inlet duct 40 at a first end portion 42 of motor housing assembly 10. The first end portion 42 is directly opposite a second end portion 44 of the motor housing assembly 10 at which outlet housing 11 of CAC assembly 12 is disposed. The motor cooling flow 38 exits at a cooling flow outlet 46. Similarly, a bearing cooling inlet 48 supplies a cooling flow for cooling bearings 28, 30 and exits motor housing assembly 10 through cooling flow outlet 46.

In an embodiment, a motor cooling supply duct 50 of the inlet housing 13 supplies the motor cooling flow 38 to the motor cooling inlet duct 40 using, for instance, a tube (not depicted). Depending upon the installation orientation of the CAC assembly 12, condensation may collect between the motor cooling supply duct 50 and the motor cooling inlet duct 40. Embodiments provide multiple installation options for the motor housing assembly 10 to reduce potential condensation collection locations such that a suitable cooling flow can be established for the CAC motor 18 without risking ingestion of a substantially large volume of water from condensation.

Figure 2:
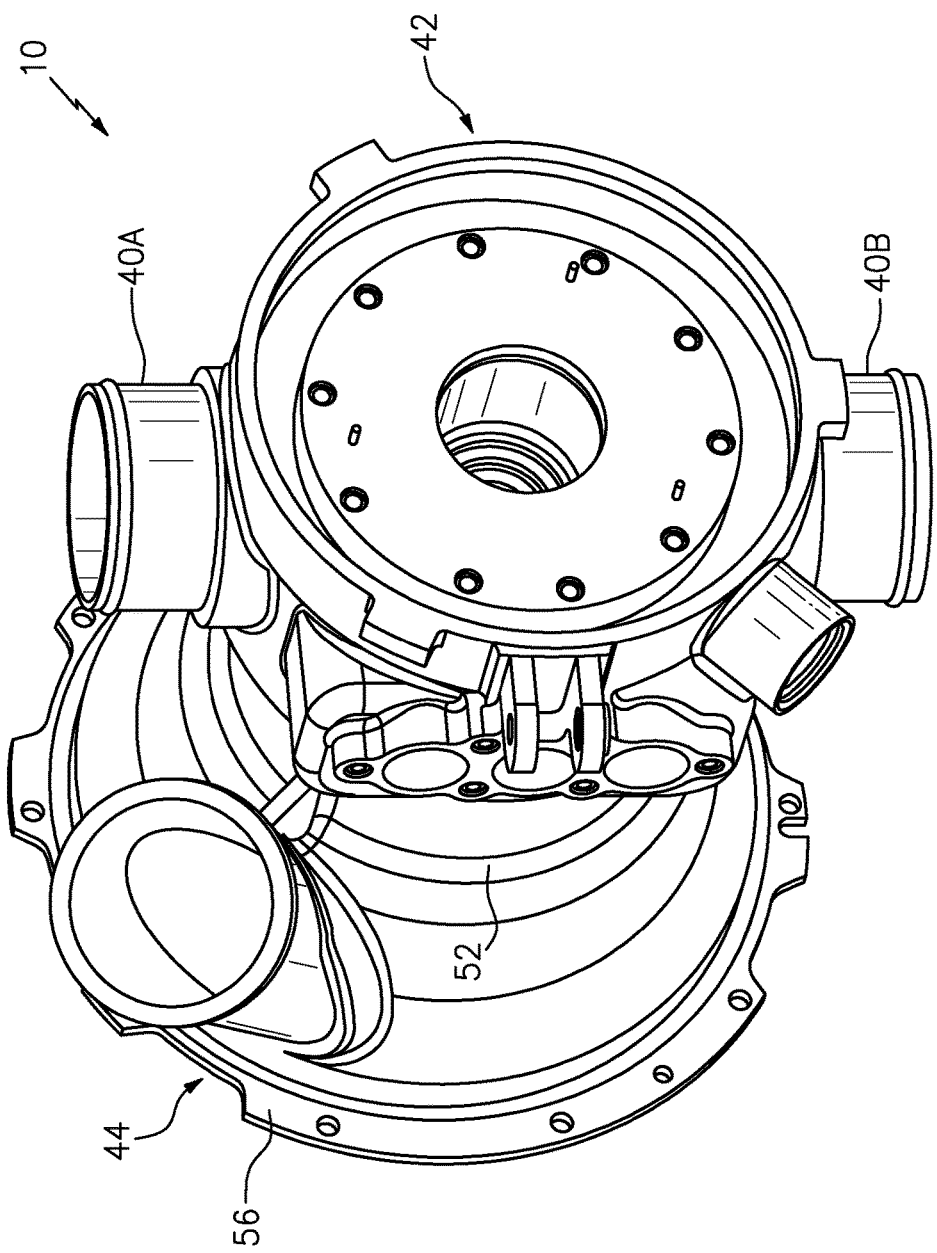
FIG. 2 is a perspective view of a motor housing assembly of the cabin air compressor assembly of FIG. 1 according to an embodiment of the invention.

FIG. 2 is a perspective view of the motor housing assembly 10 of the CAC assembly 12 of FIG. 1 according to an embodiment. In the example of FIG. 2, the motor housing assembly 10 includes a pair of cooling inlet ducts depicted as a first motor cooling inlet duct 40A and a second motor cooling inlet duct 40B at the first end portion 42. Depending upon the installation orientation of the motor housing assembly 10 either the first motor cooling inlet duct 40A or the second motor cooling inlet duct 40B can receive the motor cooling flow 38 of FIG. 1 from the motor cooling supply duct 50 of FIG. 1. The motor housing assembly 10 also includes a central body portion 52 having an internal cavity 54 (FIG. 3) that is configured to receive the CAC motor 18 of FIG. 1. The second end portion 44 of the motor housing assembly 10 includes a flange 56 that is configured to couple with the outlet housing 11 (FIG. 1) of the CAC assembly 12 of FIG. 1.

Figure 3:
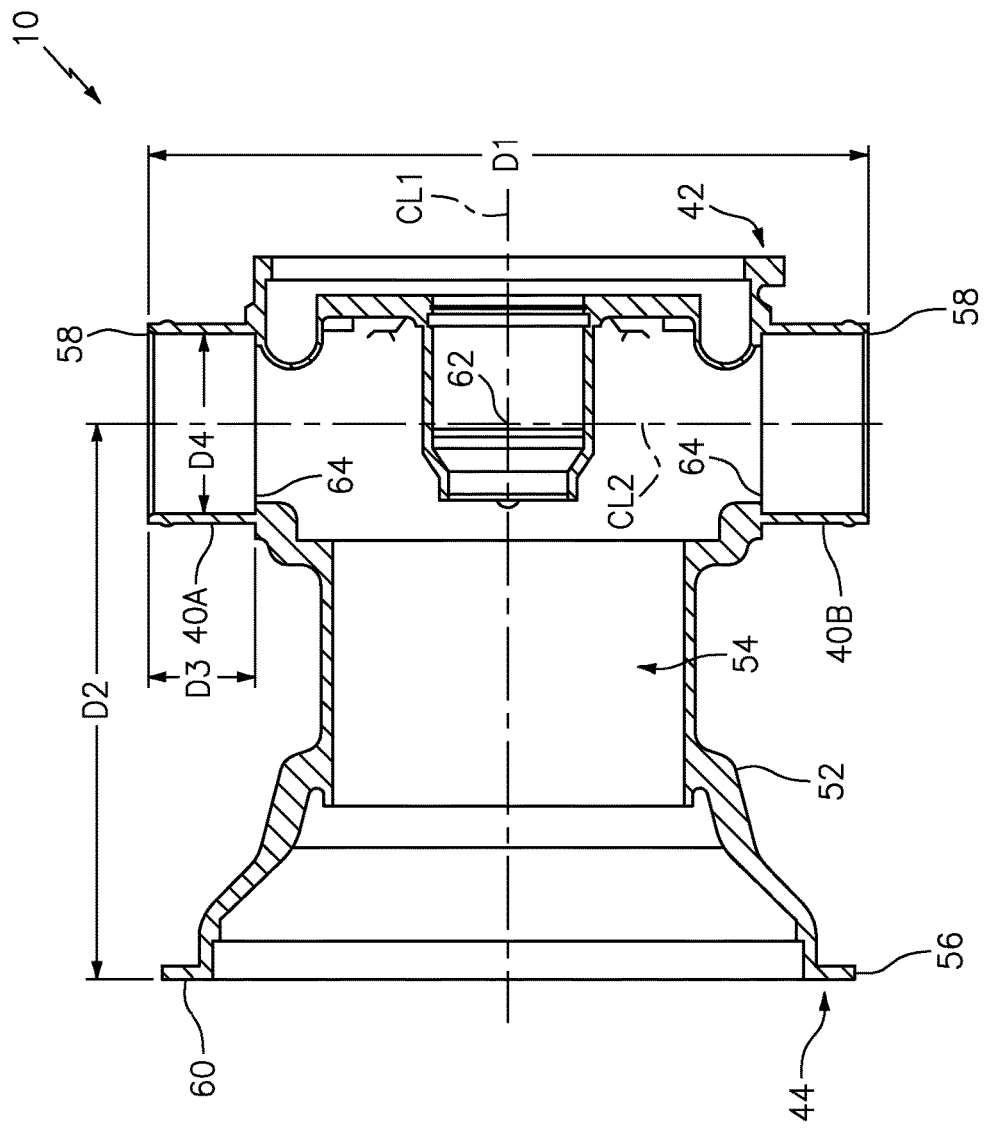
FIG. 3 is a cross-sectional view of the motor housing assembly of FIG. 2 according to an embodiment of the invention.

FIG. 3 is a cross-sectional view of the motor housing assembly 10 according to an embodiment. A central body portion centerline CL1 is defined axially between the first end portion 42 and the second end portion 44. A motor cooling duct centerline CL2 is defined between the first motor cooling inlet duct 40A and the second motor cooling inlet duct 40B. The motor cooling duct centerline CL2 is perpendicular to the central body portion centerline CL1. In an embodiment, a first distance D1 of about 11.05 inches (28.067 cm) is defined between an outer edge 58 of the first and second motor cooling inlet duct 40A, 40B. A second distance D2 of about 8.525 inches (21.654 cm) is defined between an outer face 60 of the flange 56 and an intersection 62 of the central body portion centerline CL1 with the motor cooling duct centerline CL2. In an embodiment, a ratio of the first distance D1 to the second distance D2 is between 1.29 and 1.3.

The first and second motor cooling inlet duct 40A, 40B each have an inner ledge 64. In an embodiment, a third distance D3 of about 1.65 inches (4.191 cm) is defined between the outer edge 58 and the inner ledge 64 for each of the first and second motor cooling inlet duct 40A, 40B. In an embodiment, a ratio of the first distance D1 to the third distance D3 is between 6.67 and 6.73. The first and second motor cooling inlet duct 40A, 40B each have an inner diameter of about 2.7475 inches (6.979 cm) as a fourth distance D4. In an embodiment, a ratio of the fourth distance D4 to the third distance D3 is between 1.65 and 1.68.

Figure 5:
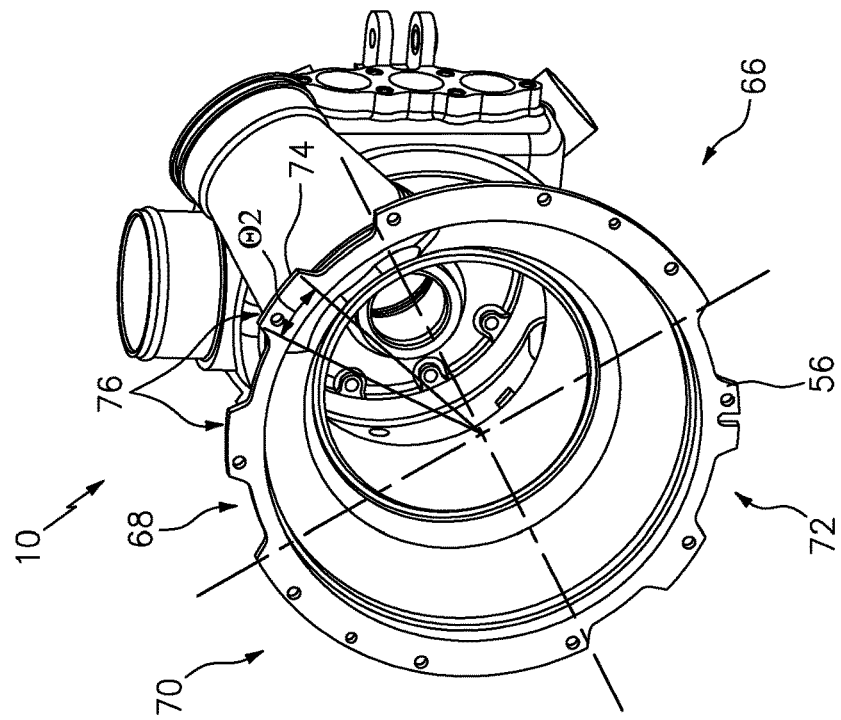
FIG. 5 is a perspective view of the motor housing assembly of FIG. 2 according to an embodiment of the invention.
Figure 4:
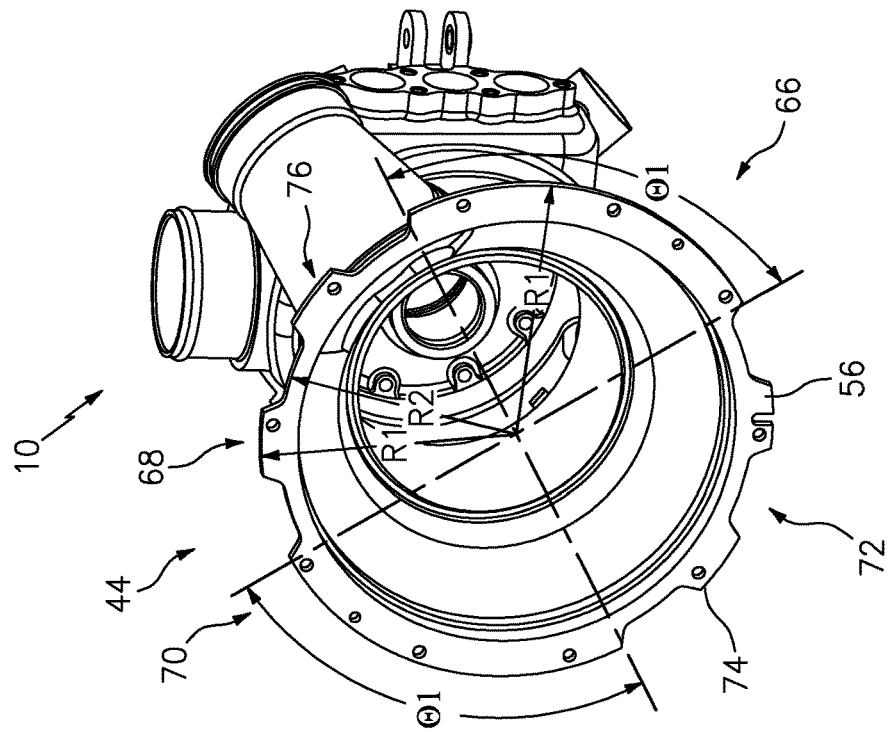
FIG. 4 is a perspective view of the motor housing assembly of FIG. 2 according to an embodiment of the invention.

FIG. 4 is a perspective view of the motor housing assembly 10 at the second end portion 44 according to an embodiment. The flange 56 can be viewed as having four quadrants including a first and third quadrant 66, 70 opposite each other that comprise a first radius R1. A second and fourth quadrant 68, 72 of the flange 56 are opposite each other and each alternate between the first radius R1 and a second radius R2. As depicted in the example of FIG. 2, the first radius R1 is greater than the second radius R2. The first, second, third, and fourth quadrants 66-72 each span an angle Θ1 of about 90 degrees. The second and fourth quadrants 68, 72 each include a plurality of flange tabs 74 formed between the first radius R1 and the second radius R2. The flange tabs 74 are sized to enable rotation of a fastener pattern 76 on the flange 56. The fastener pattern 76 includes a number of holes through which fasteners, such as bolts, can couple the motor housing assembly 10 to the outlet housing 11 of FIG. 1. As depicted in the example of FIG. 5, the fastener pattern 76 can be rotated up to an angle Θ2 of about 9 degrees relative to the configuration of FIG. 4 to support additional installation options.

Figure 7:
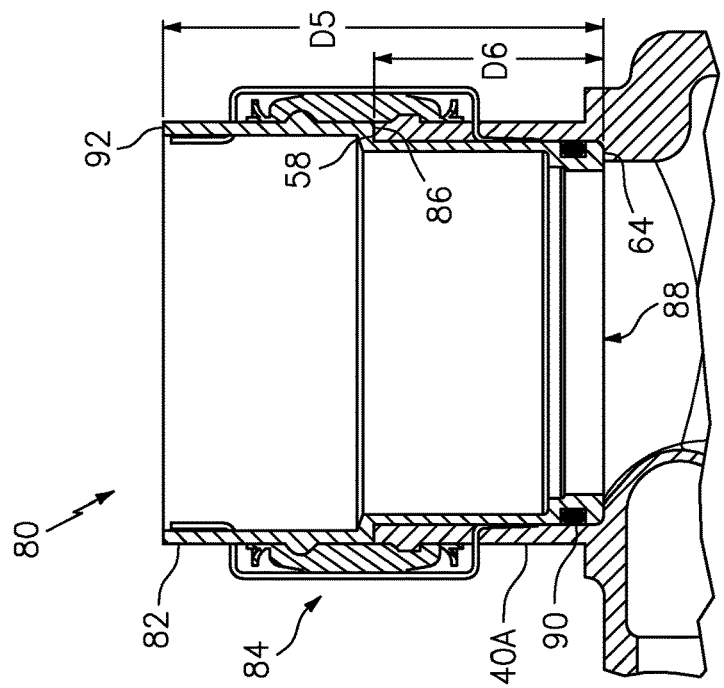
FIG. 7 is a cross-sectional view of the duct plug assembly of FIG. 6 coupled to a motor cooling inlet duct of the motor housing assembly of FIG. 2 according to an embodiment of the invention.
Figure 6:
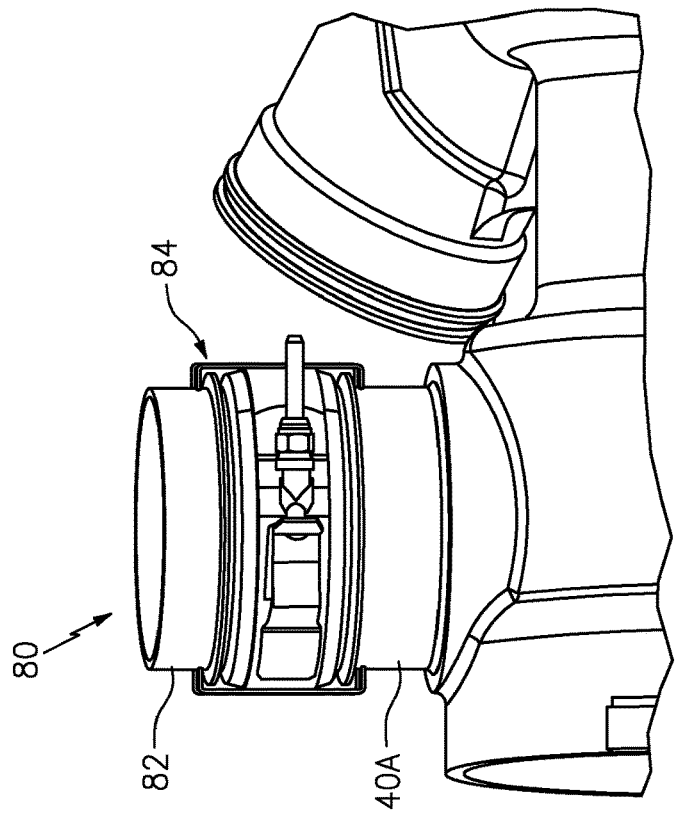
FIG. 6 is a partial perspective view of a duct plug assembly coupled to a motor cooling inlet duct of the motor housing assembly of FIG. 2 according to an embodiment of the invention.

FIG. 6 is a partial perspective view of a duct plug assembly 80 coupled to a motor cooling inlet duct 40 of the motor housing assembly 10 according to an embodiment. In the example of FIG. 6, the duct plug assembly 80 is coupled to the first motor cooling inlet duct 40A; however, the duct plug assembly 80 can alternatively be coupled to the second motor cooling inlet duct 40B of FIGS. 2 and 3. The duct plug assembly 80 includes a duct plug 82 and a coupling assembly 84. The duct plug 82 may be installed in the first or second motor cooling inlet duct 40A, 40B. The coupling assembly 84 secures the duct plug 82 in place. In an embodiment, the duct plug 82 is installed in whichever of the first or second motor cooling inlet ducts 40A, 40B is not configured to receive the motor cooling flow 38 of FIG. 1 from the motor cooling supply duct 50 of FIG. 1. As best seen in FIG. 7, the duct plug 82 includes an outer ledge 86 that is configured to align with the outer edge 58 of the first (or second) motor cooling inlet duct 40A. The duct plug 82 has a plug end 88 that is configured to seal the first (or second) motor cooling inlet duct 40A at the inner ledge 64. One or more o-ring seals 90 can be installed between the duct plug 82 and the first (or second) motor cooling inlet duct 40A. In an embodiment, the duct plug 82 has a plug length D5 of about 3.13 inches (7.95 cm) that is defined between the plug end 88 and a plug outer edge 92. The duct plug 82 also has a plug insertion length D6 of about 1.63 inches (4.14 cm) that is defined between the plug end 88 and the outer ledge 86. In an embodiment, a ratio of the plug length D5 to the plug insertion length D6 is between 1.91 and 1.93.

With reference to FIGS. 1-7, a process of installing the motor housing assembly 10 in the CAC assembly 12 includes aligning the flange 56 of the motor housing assembly 10 with the outlet housing 11 of the CAC assembly 12 such that the central body portion centerline CL1 of the motor housing assembly 10 is axially aligned with the axis of rotation X of the CAC assembly 12. The flange 56 is fastened to the outlet housing 11 with bolts, screws, or the like. CAC motor 18 is inserted into the internal cavity 54 of the motor housing assembly 10. The compressor rotor 32 is coupled to the tie rod 20 and thrust shaft 19. The inlet housing 13 is coupled to the outlet housing 11. A duct plug 82 can be installed in the first or second motor cooling inlet duct 40A, 40B, where the plug end 88 of the duct plug 82 is configured to seal the first or second motor cooling inlet duct 40A, 40B at the inner ledge 64.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A motor housing assembly for a cabin air compressor assembly, the motor housing assembly comprising:
    a central body portion having an internal cavity that is configured to receive an electric motor;
    a first end portion comprising a first and second motor cooling inlet duct; and
    a second end portion comprising a flange configured to couple with an outlet housing of the cabin air compressor assembly;
    wherein a central body portion centerline is defined axially between the first end portion and the second end portion, a motor cooling duct centerline is defined through the first and second motor cooling inlet duct and perpendicular to the central body portion centerline, a first distance is defined between an outer edge of the first and second motor cooling inlet duct, a second distance is defined between an outer face of the flange and an intersection of the central body portion centerline with the motor cooling duct centerline, and a ratio of the first distance to the second distance is between 1.29 and 1.3, wherein the first and second motor cooling inlet duct each comprise an inner ledge with a third distance defined between the outer edge and the inner ledge, and a ratio of the first distance to the third distance is between 6.67 and 6.73; and
    wherein a duct plug is installed in the first or second motor cooling inlet duct, the duct plug comprising an outer ledge configured to axially and radially align with the outer edge of the first or second motor cooling inlet duct, a plug end configured to seal the first or second motor cooling inlet duct at the inner ledge, and a coupling assembly externally securing the duct plug in the first or second motor cooling inlet duct.

2. The motor housing assembly of claim 1, wherein the duct plug has a plug length that is defined between the plug end and a plug outer edge, a plug insertion length is defined between the plug end and the outer ledge, and a ratio of the plug length to the plug insertion length is between 1.91 and 1.93.

3. The motor housing assembly of claim 1, wherein the first and second motor cooling inlet duct each comprise an inner diameter as a fourth distance, and a ratio of the fourth distance to the third distance is between 1.65 and 1.68.

4. The motor housing assembly of claim 1, wherein the flange is comprised of four quadrants including a first and third quadrant opposite each other that comprise a first radius per quadrant and a second and fourth quadrant opposite each other that alternate between the first radius and a second radius.

5. The motor housing assembly of claim 4, wherein the first radius is greater than the second radius.

6. The motor housing assembly of claim 5, wherein the second and fourth quadrant comprise a plurality of flange tabs formed between the first radius and the second radius, and the flange tabs are sized to enable rotation of a fastener pattern on a same flange tab of the flange by 9 degrees.

7. A method of installing a motor housing assembly in a cabin air compressor assembly, the method comprising:
    aligning a flange of the motor housing assembly with an outlet housing of the cabin air compressor assembly such that a central body portion centerline of the motor housing assembly is axially aligned with an axis of rotation of the cabin air compressor assembly, wherein a motor cooling duct centerline is defined through a first and second motor cooling inlet duct of the motor housing assembly and perpendicular to the central body portion centerline, a first distance is defined between an outer edge of the first and second motor cooling inlet duct, a second distance is defined between an outer face of the flange and an intersection of the central body portion centerline with the motor cooling duct centerline, and a ratio of the first distance to the second distance is between 1.29 and 1.3, wherein the first and second motor cooling inlet duct each comprise an inner ledge with a third distance defined between the outer edge and the inner ledge, and a ratio of the first distance to the third distance is between 6.67 and 6.73;
    fastening the flange to the outlet housing;
    inserting an electric motor into an internal cavity of the motor housing assembly; and
    installing a duct plug in the first or second motor cooling inlet duct, the duct plug comprising an outer ledge configured to axially and radially align with the outer edge of the first or second motor cooling inlet duct, a plug end configured to seal the first or second motor cooling inlet duct at the inner ledge, and a coupling assembly externally securing the duct plug in the first or second motor cooling inlet duct.

8. The method of claim 7, wherein the first and second motor cooling inlet duct each comprise an inner diameter as a fourth distance, and a ratio of the fourth distance to the third distance is between 1.65 and 1.68.

9. The method of claim 7, wherein the duct plug has a plug length that is defined between the plug end and a plug outer edge, a plug insertion length is defined between the plug end and the outer ledge, and a ratio of the plug length to the plug insertion length is between 1.91 and 1.93.

10. The method of claim 7, wherein the flange is comprised of four quadrants including a first and third quadrant opposite each other that comprise a first radius per quadrant and a second and fourth quadrant opposite each other that alternate between the first radius and a second radius.

11. The method of claim 10, wherein the first radius is greater than the second radius, the second and fourth quadrant comprise a plurality of flange tabs formed between the first radius and the second radius, and the flange tabs are sized to enable rotation of a fastener pattern on a same flange tab of the flange by 9 degrees.

* * * * *